US012236776B2

(12) United States Patent
Narisetty et al.

(10) Patent No.: US 12,236,776 B2
(45) Date of Patent: Feb. 25, 2025

(54) TRAFFIC MONITORING APPARATUS, SYSTEM, TRAFFIC MONITORING METHOD AND NON-TRANSITORY COMPUTER READABLE MEDIUM

(71) Applicant: NEC Corporation, Tokyo (JP)

(72) Inventors: Chaitanya Prasad Narisetty, Tokyo (JP); Tomoyuki Hino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 284 days.

(21) Appl. No.: 17/795,101

(22) PCT Filed: Jan. 27, 2020

(86) PCT No.: PCT/JP2020/002699
§ 371 (c)(1),
(2) Date: Jul. 25, 2022

(87) PCT Pub. No.: WO2021/152648
PCT Pub. Date: Aug. 5, 2021

(65) Prior Publication Data
US 2022/0375338 A1    Nov. 24, 2022

(51) Int. Cl.
*G08G 1/01*   (2006.01)
*G06N 3/045*  (2023.01)
(Continued)

(52) U.S. Cl.
CPC ........... *G08G 1/0133* (2013.01); *G06N 3/045* (2023.01); *G08G 1/0116* (2013.01);
(Continued)

(58) Field of Classification Search
CPC .. G08G 1/0133; G08G 1/0116; G08G 1/0145; G08G 1/04; G08G 1/056; G08G 1/02; G08G 1/052; G06N 3/045
(Continued)

(56) References Cited

U.S. PATENT DOCUMENTS 5,801,647 A * 9/1998 Survo ................... G08B 19/02
                                                           340/580
5,883,585 A * 3/1999 Akutsu ................... G08G 1/02
                                                           340/988
(Continued)

FOREIGN PATENT DOCUMENTS

WO   2017/072505 A1   5/2017

OTHER PUBLICATIONS

International Search Report for PCT Application No. PCT/JP2020/002699, mailed on Mar. 17, 2020.
(Continued)

*Primary Examiner* — Jaime Figueroa

(57) ABSTRACT

A traffic monitoring apparatus includes: at least one memory storing instructions; and at least one processor. The processor is configured to execute the instructions to; acquire waterfall data from a distributed acoustic sensor (DAS), wherein the waterfall data includes a generation position of a vibration on a roadway adjacent to the DAS, a generation time of the vibration and an amplitude of the vibration; preprocess the waterfall data; estimate at least one enhancement of the processed waterfall data, wherein an enhancement corresponds to a traffic flow property; and estimate at least one traffic flow property of the roadway from the enhancements of the processed waterfall data.

12 Claims, 11 Drawing Sheets

(51) Int. Cl.
G08G 1/04 (2006.01)
G08G 1/056 (2006.01)

(52) U.S. Cl.
CPC ............ *G08G 1/0145* (2013.01); *G08G 1/04* (2013.01); *G08G 1/056* (2013.01)

(58) Field of Classification Search
USPC .................................................... 701/1, 118
See application file for complete search history.

(56) References Cited

U.S. PATENT DOCUMENTS

| | | | |
|---|---|---|---|
| 6,556,916 B2* | 4/2003 | Waite | G08G 1/0133 340/933 |
| 10,198,946 B2* | 2/2019 | Crickmore | G08G 1/04 |
| 11,586,216 B2* | 2/2023 | Camacho Perez | B60W 40/06 |
| 2003/0060969 A1* | 3/2003 | Waite | G08G 1/0104 701/117 |
| 2004/0061628 A1* | 4/2004 | Hill | G08G 1/02 340/933 |
| 2004/0067004 A1* | 4/2004 | Hill | G08G 1/04 356/478 |
| 2008/0088846 A1* | 4/2008 | Hayward | H04B 10/071 73/649 |
| 2015/0120174 A1* | 4/2015 | Lewis | G08G 1/0129 701/118 |
| 2016/0078760 A1* | 3/2016 | Crickmore | G08G 1/0116 701/117 |
| 2016/0275788 A1 | 9/2016 | Wu et al. | |
| 2016/0364983 A1* | 12/2016 | Downs | G08G 1/096758 |
| 2017/0053529 A1* | 2/2017 | Yokoyama | G08G 1/0145 |
| 2018/0342166 A1 | 11/2018 | Martin et al. | |

OTHER PUBLICATIONS

English translation of Written opinion for PCT Application No. PCT/JP2020/002699, mailed on Mar. 17, 2020.

* cited by examiner

TRAFFIC MONITORING APPARATUS, SYSTEM, TRAFFIC MONITORING METHOD AND NON-TRANSITORY COMPUTER READABLE MEDIUM

This application is a National Stage Entry of PCT/JP2020/002699 filed on Jan. 27, 2020, the contents of all of which are incorporated herein by reference, in their entirety.

TECHNICAL FIELD

The present disclosure relates to a traffic monitoring apparatus, a system, a traffic monitoring method, and a non-transitory computer readable medium.

BACKGROUND ART

Optical fibers are present along numerous roadways. Distributed acoustic sensors (DASs) attached to these optical fibers are able to detect vibrations where the optical fibers are located. In some instances, these vibrations are the result of passing vehicles. DASs are able to collect data related to a number of vehicles, lane location of vehicles, trajectory of vehicles, vehicle speed, etc.

DASs generate waterfall data based on time and distance in order to determine traffic parameters. An ability of DASs to detect individual vehicles is related to an amount of noise in a signal detected by the DAS.

PL 1 discloses "The measurement signals (waterfall data) from the sensing portions are processed to detect vehicles travelling on the road and to determine at least one traffic flow property". PL 1 also discloses "using a traffic flow model to relate the detected flow property (estimated above) to a modelled flow property (actual)".

CITATION LIST

Patent Literature

PTL 1: International Publication No. 2017/072505.

SUMMARY OF INVENTION

Technical Problem

In the waterfall data, the term 'no-noise' refers to the absence of data that relates to non-traffic flow properties. In such no-noise data, it is possible to extract crucial information from the waterfall data. Each of the lines in waterfall data corresponds to a vehicle traversing a roadway. The slope of each line at a given time instant or location indicates the speed of corresponding vehicle. The overall vibration pattern corresponding to a single vehicle indicates the trajectory of said vehicle. If a vehicle accelerates or decelerates, the curvature of its pattern in the waterfall data will change accordingly. The number of lines present in waterfall data indicates the number of discernable vehicles traversing a roadway. The width and the amplitude of vibration of a particular vehicle's pattern indicate its dimensions and/or its weight. Extracting such information can be crucial for monitoring and controlling the overall traffic flow and for avoiding congestions, accidents, etc. However, in reality, it is often not possible to obtain such a clear no-noise vibration patterns in the waterfall data of a DAS.

The present disclosure has been made in view of the aforementioned problem and aims to provide a traffic monitoring apparatus, a system and a traffic monitoring method capable of estimating interpretable labels.

Solution to Problem

A traffic monitoring apparatus according to the present disclosure is a traffic monitoring apparatus including:
at least one memory storing instructions; and
at least one processor configured to execute the instructions to;
acquire waterfall data from a distributed acoustic sensor (DAS), wherein the waterfall data includes a generation position of a vibration on a roadway adjacent to the DAS, a generation time of the vibration and an amplitude of the vibration;
preprocess the waterfall data;
estimate at least one enhancement of the processed waterfall data, wherein an enhancement corresponds to a traffic flow property; and
estimate at least one traffic flow property of the roadway from the enhancements of the processed waterfall data.

A system according to the present disclosure is a system including:
a distributed acoustic sensor (DAS);
an optical fiber connected to the DAS and provided along a roadway; and
the traffic monitoring apparatus as described above.

A traffic monitoring method according to the present disclosure is a traffic monitoring method including:
acquiring the waterfall data from a distributed acoustic sensor (DAS), wherein the waterfall data includes a generation position of a vibration on a roadway adjacent to the DAS, a generation time of the vibration and an amplitude of the vibration;
preprocessing the waterfall data;
estimating at least one enhancement of the processed waterfall data, wherein an enhancement corresponds to a traffic flow property; and
estimating at least one traffic flow property of the roadway from the enhancements of the processed waterfall data.

A non-transitory computer readable medium according to the present disclosure is a non-transitory computer readable medium storing a program for causing a computer to execute a traffic monitoring method, the method including:
acquiring the waterfall data from a distributed acoustic sensor (DAS), wherein the waterfall data includes a generation position of a vibration on a roadway adjacent to the DAS, a generation time of the vibration and an amplitude of the vibration;
preprocessing the waterfall data;
estimating at least one enhancement of the processed waterfall data, wherein an enhancement corresponds to a traffic flow property; and
estimating at least one traffic flow property of the roadway from the enhancements of the processed waterfall data.

Advantageous Effects of Invention

According to the present disclosure, it is possible to provide a traffic monitoring apparatus, a system, a traffic monitoring method, and a non-transitory computer readable medium capable of estimating interpretable labels.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION OF EMBODIMENTS

Figure 1:
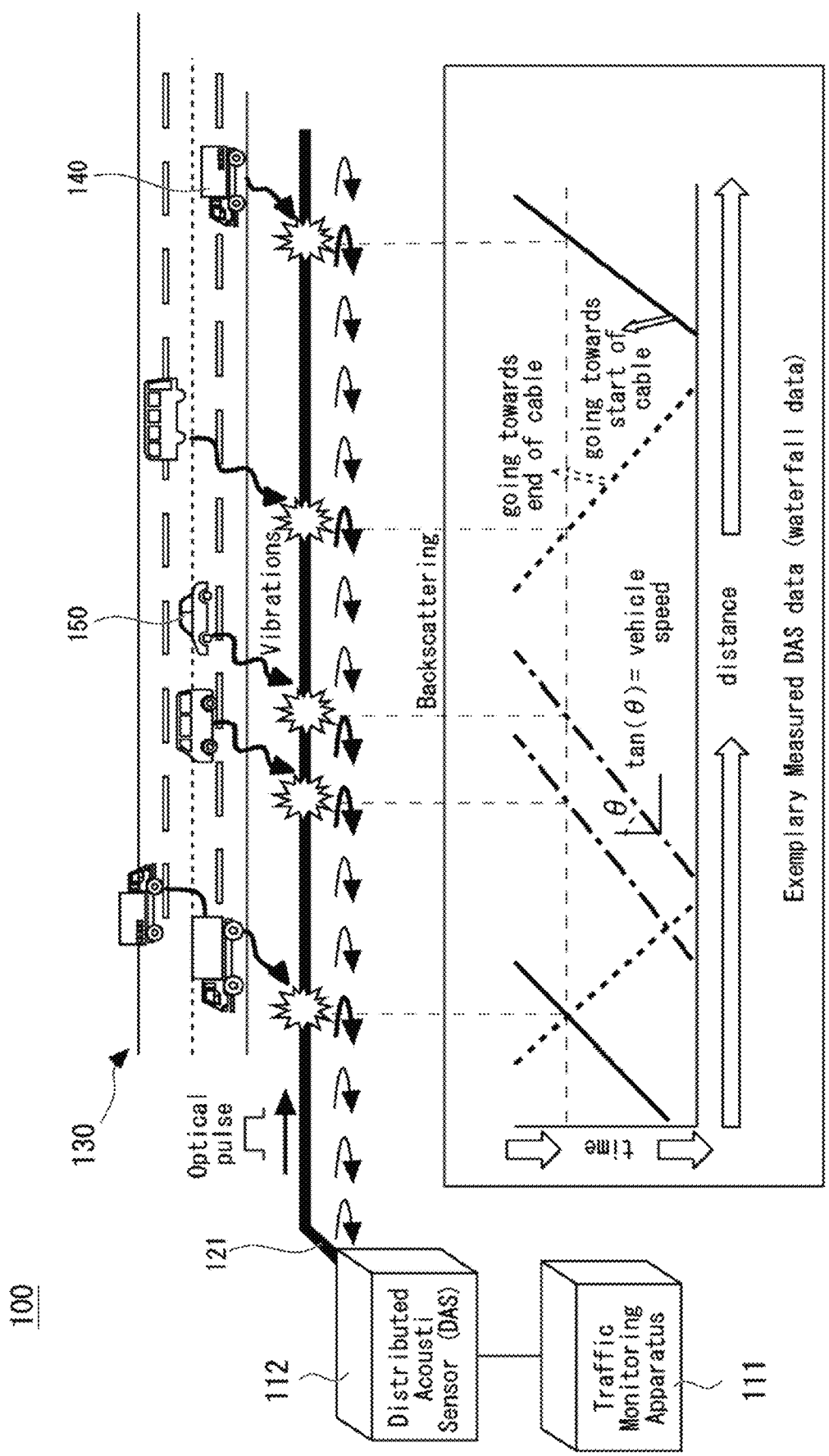
FIG. 1 is a schematic view illustrating the configuration of a distributed acoustic sensor (DAS) system along a roadway in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a schematic view illustrating the configuration of a distributed acoustic sensor (DAS) system 100 along a roadway 130 in accordance with some embodiments. DAS system 100 includes a traffic monitoring apparatus 111 in communication with a DAS 112. DAS system 100 further includes an optical fiber 121 connected to DAS 112. Optical fiber 121 extends along roadway 130. A plurality of sensing portions are provided on the optical fiber 121. Roadway 130 may include, for example, four lanes, two lanes each for ongoing and incoming traffic. Numerous vehicles are on roadway 130. Some vehicles 140 (e.g. truck in FIG. 1) on roadway 130 are larger than other vehicles 150 (e.g. passenger automobile in FIG. 1) on roadway 130. Furthermore, some vehicles 140 on roadway 130 are travelling away from DAS 112 while some vehicles 150 on roadway 130 are travelling towards DAS 112. Furthermore, some vehicles 140 on roadway 130 are travelling in an inner lane while some vehicles 150 on roadway 130 are in an outer lane.

As vehicles 140 and 150 pass along roadway 130, the vehicles generate vibrations. These vibrations change a manner in which light propagates along optical fiber 121. DAS 112 is connected to optical fiber 121 and sends an optical signal down optical fiber 121 and detects the returned light from optical fiber 121. The resulting data is called waterfall data. The waterfall data provides information related to a number of vehicles, travelling direction of the vehicles, trajectory and speed of the vehicles, and lane location of the vehicles on roadway 130.

Roadway 130 in FIG. 1 may include sections of solid ground, bridges, tunnels, etc. Due to wind, passage of previous vehicles and other phenomena, the solid ground does not vibrate at a sufficiently high amplitude to obscure the detection of vehicles 140 and 150 on traveling along roadway 130. As a result, DAS 112 is able to precisely detect vehicles 140 and 150 traveling along roadway 130.

Unlike solid ground, bridges vibrate due to wind, passage of previous vehicles and other phenomena. In some instances, the vibration of the bridge due to wind, passage of previous vehicles and other phenomena is sufficiently high to obscure the vibration generated by a passing vehicle 140 or 150. As a result, DAS 112 is unable to precisely detect vehicles 140 and 150 traveling along roadway 130. Accordingly, monitoring of traffic on a bridge is more difficult than monitoring of traffic along roadway 130 on solid ground.

Unlike bridges, tunnels tend to dampen the vibrations caused because of passing vehicles 140 or 150. As a result, the trajectories of smaller vehicles or vehicles passing in lanes further away from the optical fiber 121, are less pronounced as compared to those passing on solid ground. This phenomenon may make it more difficult to monitor traffic along a tunnel than monitoring of traffic along roadway 130 on solid ground.

FIG. 1 also includes exemplary measured DAS data. This exemplary measured DAS data is provided to assist in the understanding of waterfall data collected by DAS 112.

Figure 2:
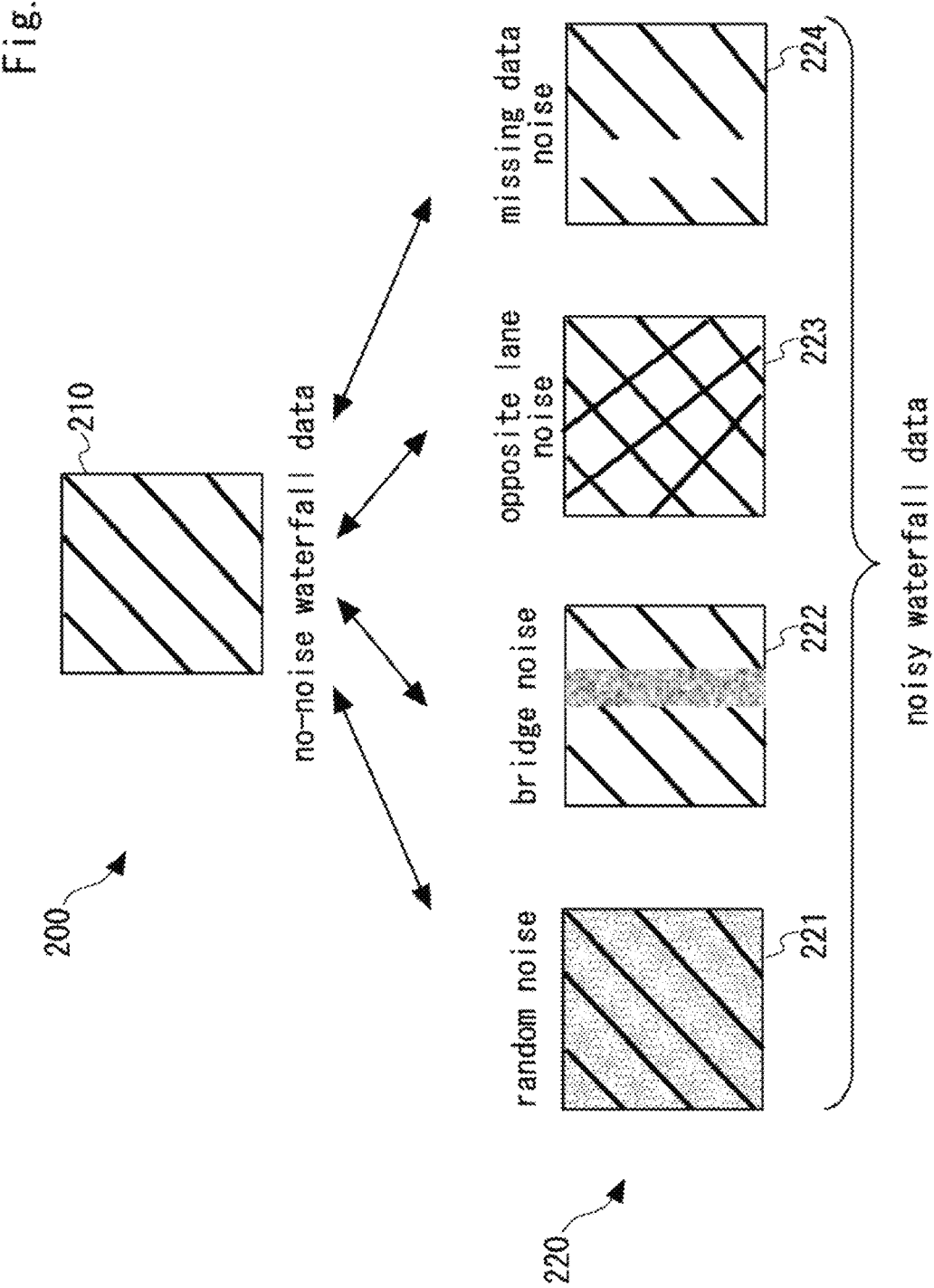
FIG. 2 is a view illustrating different variations of waterfall data corresponding to a no-noise variation in accordance with some embodiments.

FIG. 2 is a view illustrating different variations of waterfall data corresponding to a no-noise variation of said waterfall data. Waterfall data 210 illustrates a data with low or no-noise. Waterfall data 221, 222, 223, 224 illustrate some of noisy variations of waterfall data 210.

In the waterfall data 210, the term 'no-noise' refers to the absence of data that relates to non-traffic flow properties. In such no-noise data, it is possible to extract crucial information from the waterfall data 210. Each of the lines in waterfall data 210 corresponds to a vehicle traversing a roadway. The slope of each line at a given time instant or location indicates the speed of corresponding vehicle. The overall vibration pattern corresponding to a single vehicle indicates the trajectory of said vehicle. If a vehicle accelerates or decelerates, the curvature of its pattern in the waterfall data 210 will change accordingly. The number of lines present in waterfall data 210 indicates the number of discernable vehicles traversing a roadway. The width and the amplitude of vibration of a particular vehicle's pattern indicate its dimensions and/or its weight. Extracting such information can be crucial for monitoring and controlling the overall traffic flow and for avoiding congestions, accidents, etc. However, in reality, it is often not possible to obtain such a clear no-noise vibration patterns in the waterfall data of a DAS.

Vibrations corresponding to passing vehicles are affected by the presence of ambient vibrations, winds, rainfall, etc., in the vicinity of a roadway. Such noises in addition to the inherent noise of the DAS may appear as a random noise as illustrated in waterfall data 221.

A roadway may include one or more bridges. Bridges often vibrate heavily in presence of strong winds and passing vehicles. These vibrations can be significantly higher than the vibration of solid ground. Such properties of a bridge create a type of distinct noise and is illustrated in waterfall data 222 in FIG. 2. The waterfall data measured in the location range of a bridge has no discernable vehicle trajectories and makes it difficult to monitor traffic flow effectively.

In typical roadways, traffic flow is in both directions. Depending on the direction of interest, the traffic opposite lane could be treated as a noise. Waterfall data 223 illustrates vibrations patterns of vehicles traversing in both directions along the roadway. Such opposite lane traffic patterns can cause interfere while extracting traffic flow properties. Therefore, it is important that a traffic monitoring apparatus is capable of both detecting and separating the patterns of different directions of traffic flow.

Depending on the fiber cable installation, the cable may not be always running alongside a roadway. Some sections of the roadway may be quite rigid or fairly far away from the fiber cable. Such situations, but not limited to, can leave gap(s) in the waterfall data in some portion(s) of the roadway. This is illustrated by waterfall data 224 in FIG. 2. Instead of having gaps in the waterfall data, also the vibrations may be dampened by structures like tunnels or when the fiber cable is buried a bit deep. This can weaken the patterns detected from the vibration of smaller vehicles. Therefore, it is important that a traffic monitoring apparatus is capable of both detecting and filling in the gaps (if any) in waterfall data 224.

In reality, there can be more variations than the ones illustrated in waterfall data 220. Often these variations co-exist make it that much more difficult to monitor traffic flow effectively. The present invention aims to robustly overcome such noises in measured DAS data and carefully enhance the patterns of interest an estimate traffic flow properties.

Figure 3:
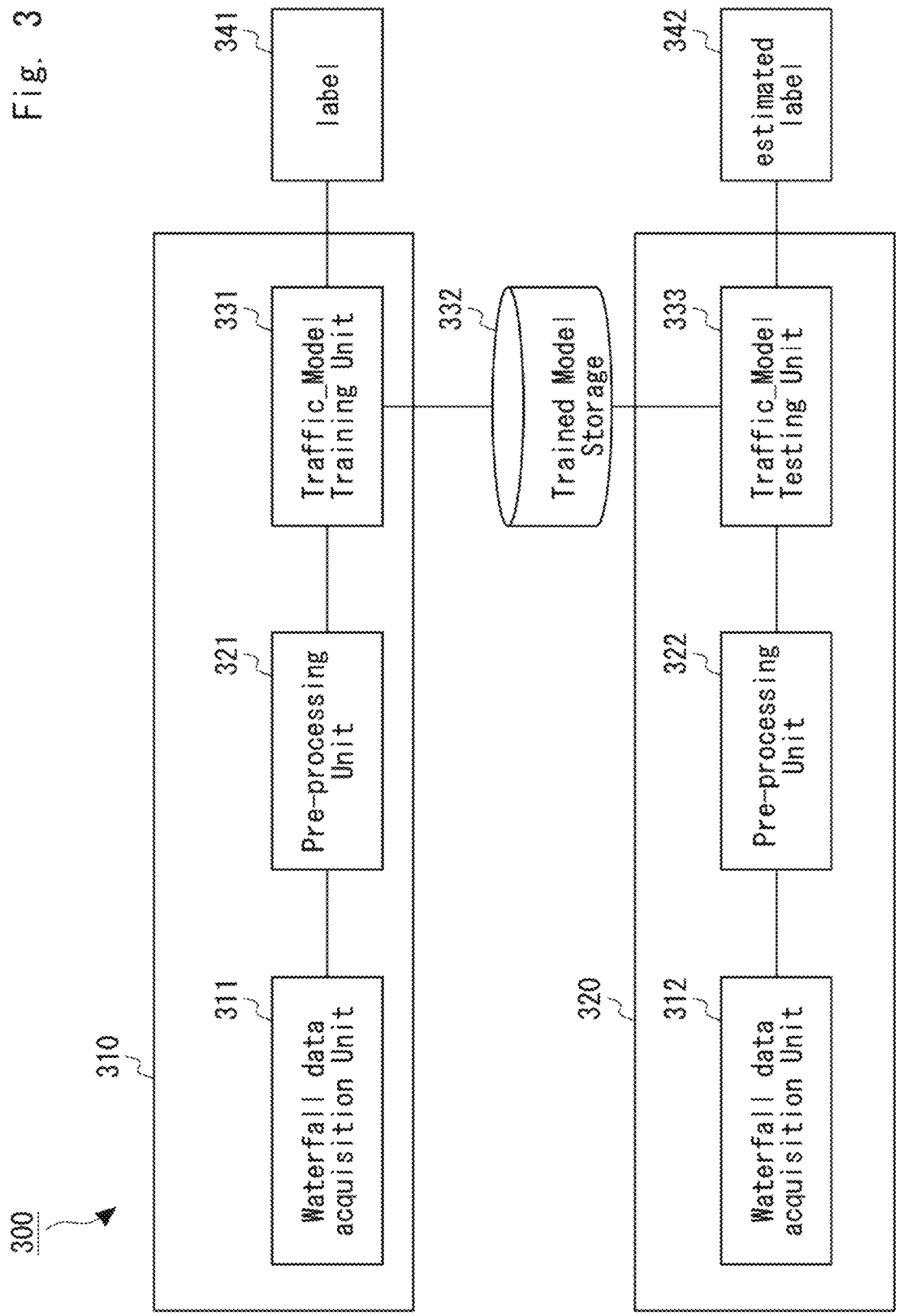
FIG. 3 is a functional block diagram illustrating a configuration of a comparative example system for analyzing waterfall data.

FIG. 3 is a functional block diagram illustrating a comparative example system for analyzing waterfall data. System 300 includes Learning apparatus 310 and Testing apparatus 320.

First, Learning apparatus 310 will be described below.

Learning apparatus 310 acquires waterfall data from DAS and learns traffic flow properties from the acquired waterfall data. As shown in FIG. 3, Learning apparatus 310 includes waterfall data acquisition unit 311; pre-processing units 321; and Training unit 331. The waterfall data acquisition unit 311 receives and acquires waterfall data 311a (see FIG. 4) from DAS.

The pre-processing unit 321 is configured to normalize vibration amplitude of the waterfall data at each position along a roadway (e.g., roadway 130 in FIG. 1), across a predetermined time duration. Variations in sensitivity of the optical fiber comes from several sources including, but not limited to, uneven surfaces of the roadway, inconsistent installation of the optical fiber, and inconsistencies in the optical fiber. Normalizing the vibration amplitude also helps to account for variations in traffic volume. For example, as a number of vehicles on the roadway increases, a magnitude of vibrations detected by the DAS will increase. Normalizing the vibration amplitude based on a predetermined time duration can reduce an effect of the large magnitude vibrations detected during high traffic conditions on time periods with low traffic conditions. Thus, it is possible to produce more precise data for estimating traffic properties.

In some embodiments, preprocessing the waterfall data also can limit a maximum vibration amplitude at each position along the optical fiber for the predetermined time duration. Limiting the maximum vibration amplitude helps to prevent vibrations from large vehicles (e.g., trucks or construction vehicles) from obscuring vibrations generated by smaller vehicles (e.g., passenger automobiles).

Preprocessing the waterfall data can easily identify and track individual vehicles along the roadway. Accordingly, it is possible to more precisely determine traffic properties during different time periods.

The Label 341 used by Training unit 331 may include at least one traffic flow property including, but not limited to, number of vehicles, average traffic speed and travel time. The training unit 331 creates a model and thus trains the model to correlate waterfall data obtained by the unit 311 to its corresponding known label 341. Such model training is a fairly common practice in the field of machine learning. Such training techniques may include, but not limited to, support vector machines (SVM), neural networks and linear regression.

The model trained as described above is stored in Trained Model Storage 332. In FIG. 3, Trained Model Storage 332 is connected to Training unit 311 and Testing unit 333 via network. Note that Trained Model Storage 332 may be inside Learning Apparatus 310 or Testing Apparatus 320.

Next, Testing apparatus 320 will be explained below.

Figure 5:
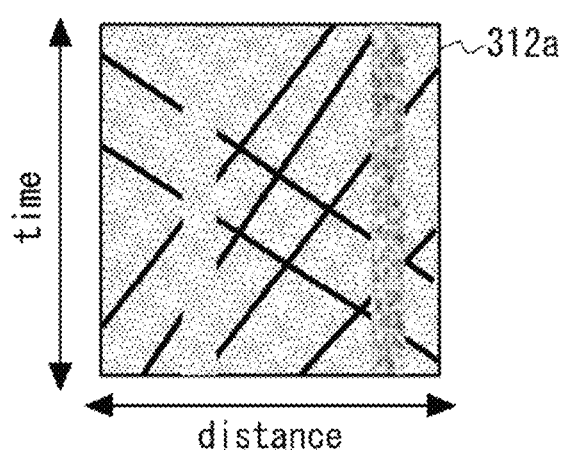
FIG. 5 is a view illustrating an example of waterfall data.

Testing apparatus 320 acquires waterfall data and estimates traffic flow properties from the acquired waterfall data. Testing apparatus 320 includes a waterfall data acquisition unit 312; Pre-processing unit 322; and Testing unit 333. The waterfall data acquisition unit 312 receives and acquires waterfall data 312a (see FIG. 5) from DAS.

The preprocessing unit 322 is configured to normalize vibration amplitude of the waterfall data at each position along a roadway (e.g., roadway 130 in FIG. 1), across a predetermined time duration. Normalizing the vibration amplitude helps to account for variations in sensitivity of the optical fiber. Variations in sensitivity of the optical fiber comes from several sources including, but not limited to, uneven surfaces of the roadway, inconsistent installation of the optical fiber, and inconsistencies in the optical fiber. Normalizing the vibration amplitude also helps to account for variations in traffic volume. For example, as a number of vehicles on the roadway increases, a magnitude of vibrations detected by the DAS will increase. Normalizing the vibration amplitude based on a predetermined time duration can reduce an effect of the large magnitude vibrations detected during high traffic conditions on time periods with low traffic conditions. Thus, it is possible to produce more precise data for estimating traffic properties.

In some embodiments, preprocessing the waterfall data also can limit a maximum vibration amplitude at each position along the optical fiber for the predetermined time duration. Limiting the maximum vibration amplitude helps to prevent vibrations from large vehicles (e.g., trucks or construction vehicles) from obscuring vibrations generated by smaller vehicles (e.g., passenger automobiles).

Preprocessing the waterfall data can easily identify and track individual vehicles along the roadway. Accordingly, it is possible to more precisely determine traffic properties during different time periods.

Testing unit 333 estimates a label 342 from a preprocessed waterfall data using the trained model 332 trained by the Training unit 331. Estimated label 342 may include at least one traffic flow property including, but not limited to, the number of vehicles, average traffic speed and travel time. Since the accuracy of the estimated label depends on the effectiveness of the trained model 332, it is important that the trained model be robust to the various noises present in the waterfall data. In general, such robustness is introduced into the trained model 332 by training a diverse and large database of waterfall data 311 and their corresponding set of labels 341.

One of the problems with the comparative example system 300 is that its output, in particular, the traffic flow properties in estimated label 342 are not interpretable. Accordingly, when there is an error in estimation of a traffic flow property, the reason of this error cannot be discerned. In order to estimate interpretable labels, the present disclosure proposes to enhance the waterfall data 312 to at least one enhanced variation, in which each enhanced variation corresponds to at least one traffic flow property.

Figure 6:
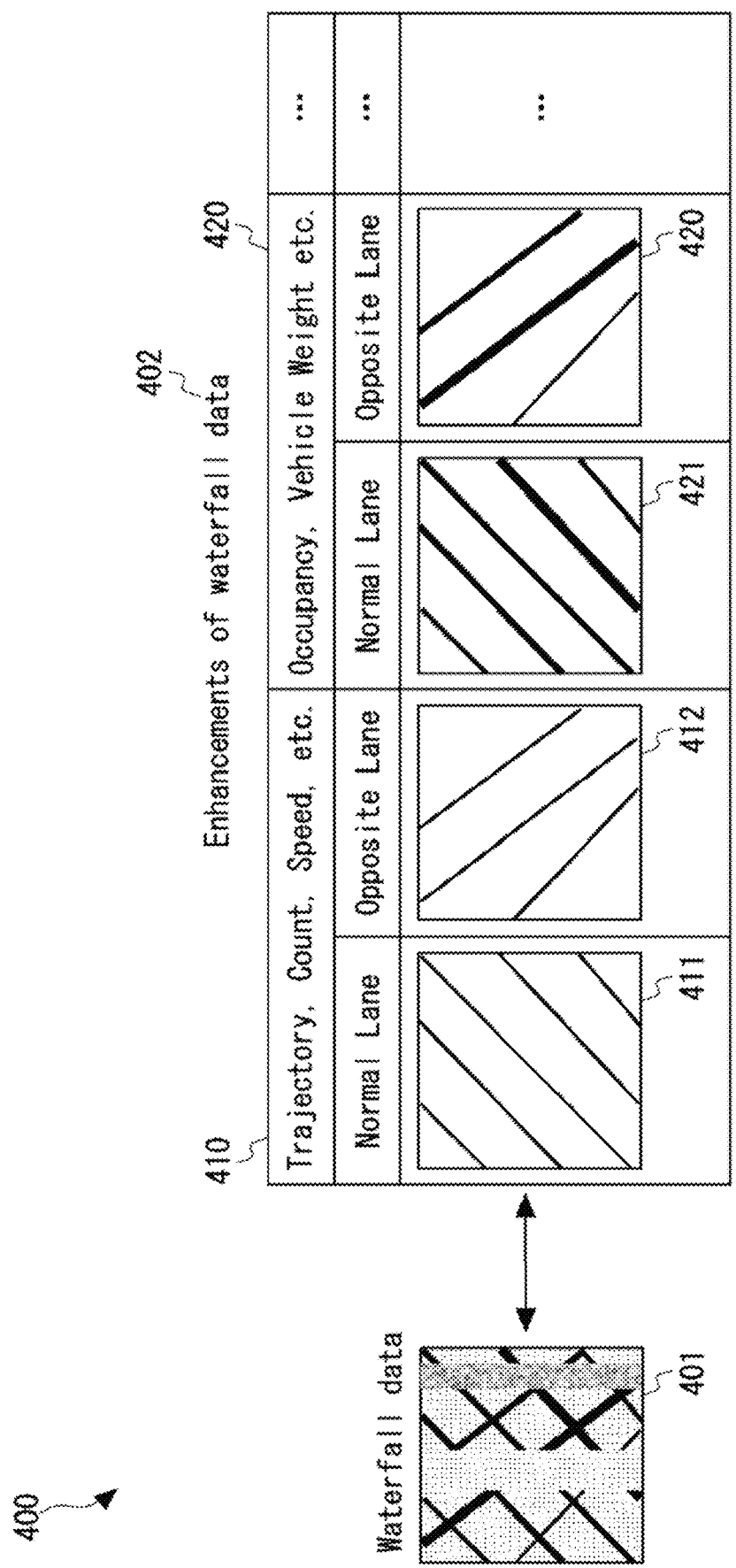
FIG. 6 is a view illustrating various enhancements of waterfall data in accordance with some embodiments.

FIG. 6 is a view illustrating various enhancements of waterfall data in accordance with some embodiments. FIG. 6 shows a view of noisy waterfall data 401 and its enhancements 402. The set of enhancements 402 includes, but not limited to, subsets of enhancements 410 and 420. The subset of enhancement 410 includes enhanced waterfall data 411, 412. The subset of enhancement 420 includes enhanced waterfall data 421 and 422. Waterfall data 401 illustrates the typical noises seen in the data measured from the DAS. These noises are similar to the random, bridge, opposite lane, missing data noises illustrated in the waterfall data 220 in FIG. 2. Waterfall data 401 further shows that there are five vehicles moving in one direction as shown in waterfall data 411, while there are three vehicles moving in an opposite direction as shown in waterfall data 412. Waterfall data 401 further shows that the vibration patterns of vehicles need not have the same thickness. Thickness of each vehicle's vibration pattern corresponds to, but not limited to, dimensions and/or weight of the vehicle.

The enhancements 410 correspond to the traffic flow properties of, but not limited to, vehicle trajectories, vehicle count and vehicle speed. This correspondence can be understood as an extraction of information essential for estimating vehicle trajectories. To track a vehicle over a particular time range or distance range, it is important that the trajectory of said vehicle is a clear line having minimal ambiguity. From each of the lines in the enhanced waterfall data 411 and 412, it is possible to determine the instantaneous and average speed of a corresponding vehicle. Instantaneous speed of a vehicle should, in general, correspond to the slope of said vehicle's vibration pattern at a given location or time instant. Average speed of a vehicle in a particular time range of interest should, in general, correspond to the total distance traversed by said vehicle divided by the length of the particular time range. The number of lines in waterfall data 411 will indicate the number of vehicles travelling in a particular direction (the normal direction). Also, the number of lines in waterfall data 412 will indicate the number of vehicles travelling in a particular direction (the opposite direction). By modelling each vehicle trajectory, it is also possible to predict when said vehicle is going to reach a particular location. Therefore, it is possible to both estimate and forecast travel time for each vehicle, and by extension for a plurality of vehicles.

The enhancements 420 correspond to the traffic flow properties including, but not limited to, occupancy of a lane/roadway, weight and dimensions of vehicle(s), damage incurred by the roadway. This correspondence can be understood as an extraction of information essential for estimating the effect of a vehicle's presence on a roadway. Such effects can be estimated by analyzing the amplitude and characteristics of the vibration patterns of each vehicle. From each of the lines in the enhanced waterfall data 421 and 422, it is possible to determine the dimensions and/or weight of a corresponding vehicle. Dimensions of a vehicle in waterfall data 421 and 422 should, in general, be proportional to the width of said vehicle's vibration pattern. Weight of a vehicle in waterfall 421 and 422 should, in general, be proportional to the total amount of vibration amplitude measured at a given location or at a given time instant. By estimating the dimensions of each of the vehicles in waterfall data 421 and 422, it is possible to determine how much of a lane or roadway is occupied, which in turn can be a metric to determine congestion. By estimating the weight of each of vehicle in waterfall data 421 and 422, it is possible to detect overweight vehicles (a vehicle whose weight is more than what is permissible for the roadway). And the total weight of all vehicles traversing on a lane or roadway in a time range would indicate the amount of damage incurred by said lane or roadway.

Enhanced waterfall data 411 and 421 correspond to a set of vehicles travelling in the opposite direction to another set of vehicles corresponding to enhanced waterfall data 412 and 422. Such separation of vehicle patterns corresponding to each direction of traffic flow is crucial for monitoring traffic effectively. In some situations where traffic is legally allowed to flow only in a particular direction, such separation can detect illegal flow of traffic in an opposite direction. In some situations where overtaking is not allowed, such separation can help in detecting intersection(s) of vehicle trajectories (overtaking), because the separated vehicle trajectories flow in the same direction.

Figure 7:
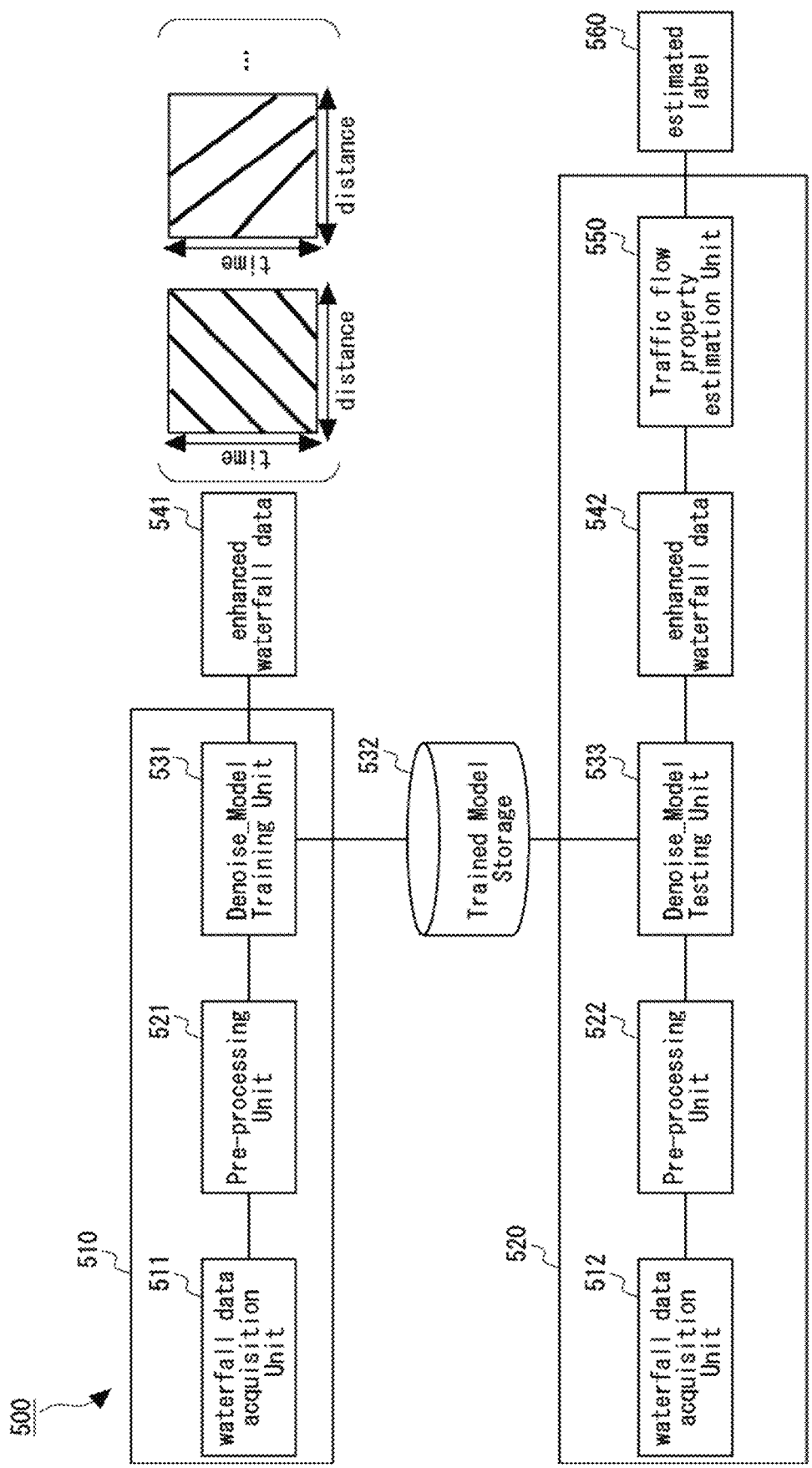
FIG. 7 is a view illustrating a functional configuration of a proposed system of analyzing waterfall data in accordance with some embodiments.

FIG. 7 is a functional block diagram illustrating a system of analyzing waterfall data in accordance with some embodiments. System 500 includes Learning apparatus 510 and Testing apparatus 520.

First, Learning apparatus 510 will be described below.

Figure 4:
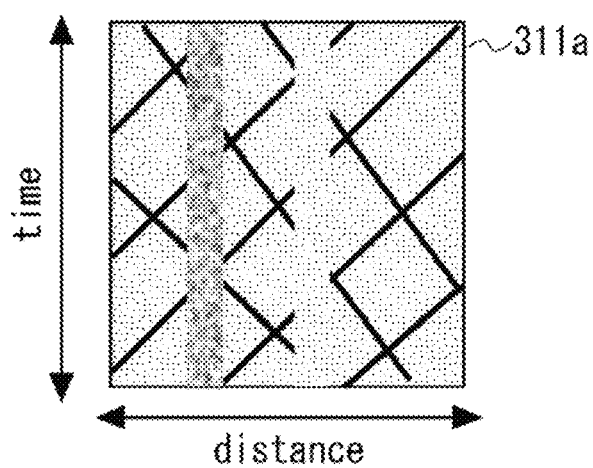
FIG. 4 is a view illustrating an example of waterfall data.
Figure 8:
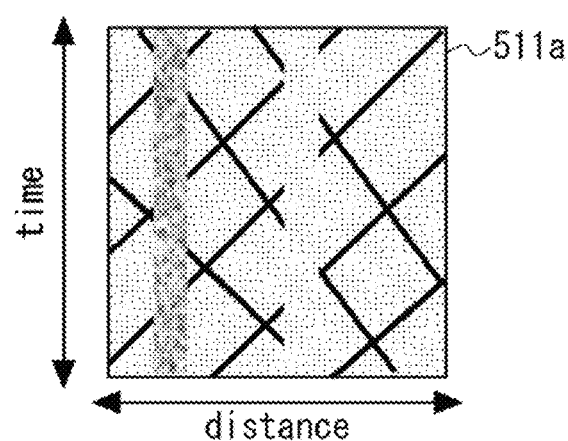
FIG. 8 is a view illustrating an example of waterfall data.

The learning apparatus 510 learns traffic flow properties from waterfall data. In this system, Enhanced waterfall data 541 and 542 as shown in FIG. 4 are prepared for waterfall data 511 and 512, respectively. The learning apparatus 510 includes waterfall data acquisition unit 511; preprocessing unit 521; and denoising model training unit 531. The waterfall data acquisition unit 511 receives and acquires waterfall data 511a (see FIG. 8) from DAS.

Preprocessing unit 521 preprocesses waterfall data 511a in a manner similar to the preprocessing unit 321 as described above. Preprocessing includes, but not limited to, normalizing vibration amplitude of the waterfall data at each position along a roadway across a predetermined time duration, limiting a maximum vibration amplitude at each position along the optical fiber for a predetermined time duration. Preprocessing intends to improve the quality of waterfall data as best as possible using standard image enhancement and/or noise reduction techniques.

The denoising training unit 531 trains a model 532a in order to correlate waterfall data 511a to its corresponding known enhanced set of waterfall data 541. Enhanced waterfall 541 corresponds to at least one enhancement in which each enhancement corresponds to a traffic flow property. The examples of traffic flow properties include, but not limited to, traffic flow volume, vehicle count, speed, trajectories, dimensions, weight, lane occupancy, damage, overweight vehicles and illegal overtaking. An illustration of enhanced waterfall data 541 is shown in the set of waterfall data 402 in FIG. 4.

Enhanced waterfall data 541 may be obtained from a secondary acquisition means. The examples of the secondary acquisition means include, but not limited to, video monitoring system, inductive loop detector, GPS (Global Positioning System), electronic toll collection system and RADAR/LiDAR monitoring system. Techniques used by model training unit 531 may include, but not limited to, support vector machines (SVM), neural networks, random forests, linear regression and decision trees.

In some embodiments, it may be difficult, expensive or time-consuming to obtain the pair of waterfall data 511 and 541 used for the generation of trained model 532. When neural network based techniques used by the training unit 531 is used, it is often necessary to have several thousands of diverse and expansive training data samples to ensure that the trained model 532 is robust. In such cases, the pair of waterfall data and its enhancements can be synthetically generated by emulating the real world waterfall data and may be used to augment the real world waterfall data available for training. One approach for such synthetic data generation is to simply create thousands of waterfall data with various combinations of, but not limited to, vehicle trajectories, vibration amplitudes, trajectory thickness, bridge(s), missing data area(s), random noise(s) and presence/absence of opposite lane traffic. In case of deficiency in the amount or diversity of training data pairs, generative adversarial networks (GAN) is useful as an alternative approach for synthetic data generation.

The trained model created as described above is stored in the Trained Model Storage 532. In FIG. 7, Trained Model Storage 532 is connected to Training unit 531 and Testing unit 533 via network. Note that Trained Model Storage 532 may be inside Learning Apparatus 510 or Testing Apparatus 520.

Next, Testing apparatus 520 will be described below.

Figure 9:
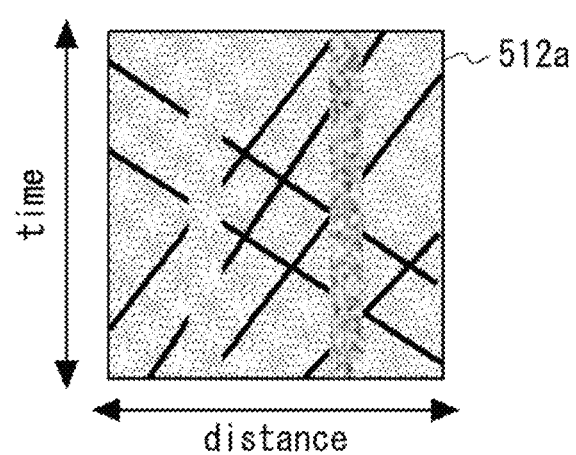
FIG. 9 is a view illustrating an example of waterfall data.

Testing apparatus 520 estimates traffic flow properties from waterfall data 512 in relation to some embodiments. Testing apparatus 520 may be one example of the traffic monitoring apparatus. Testing apparatus 520 includes waterfall data acquisition unit 512; preprocessing unit 522; testing unit 533; enhanced waterfall data 542 for waterfall data 512, a traffic flow property estimation unit 550 and an estimated label 560. The waterfall data acquisition unit 512 receives and acquires waterfall data 512a (see FIG. 9) from DAS.

The preprocessing unit 522 preprocesses waterfall data 512 in a manner similar to the preprocessing operations 321 and 322 as shown in FIG. 3. The examples of Preprocessing include, but not limited to, normalizing vibration amplitude of the waterfall data at each position along a roadway across a predetermined time duration, limiting a maximum vibration amplitude at each position along the optical fiber for a predetermined time duration. Preprocessing intends to improve the quality of waterfall data as best as possible using standard image enhancement and/or noise reduction techniques.

The denoising model testing unit 533 estimates enhanced waterfall data 542 from waterfall data 512 using the trained model stored in the storage 532. Enhanced waterfall data 542 includes at least one enhancement trained by training unit 531 in which each enhancement corresponds to a traffic flow property. Since the accuracy of the enhanced waterfall data depends on the effectiveness of the model 532 trained by training unit 531, it is important that the trained model be robust to the various noises present in waterfall data acquired by waterfall data acquisition units 511 and 512. In general, such robustness is introduced into the trained model 532 by training a diverse and large database of waterfall data 511 and their corresponding enhancements 541.

Traffic flow property estimation unit 550 estimates a traffic flow property label 560 from each of the enhanced waterfall data 542 for each direction of traffic flow on a roadway. Estimated label 560 includes at least one traffic flow property including, but not limited to, traffic flow volume, vehicle count, speed, trajectories, dimensions, weight, lane occupancy, damage, overweight vehicles and travel time. The traffic flow property corresponding to an enhancement may be the trajectory of each vehicle on the roadway. Also, the traffic flow property corresponding to an enhancement may be the size of each vehicle and/or the occupancy of the roadway. Traffic flow property estimation unit 550 may estimate each enhancement within a predetermined time range and within a predetermined position range.

Figure 10:
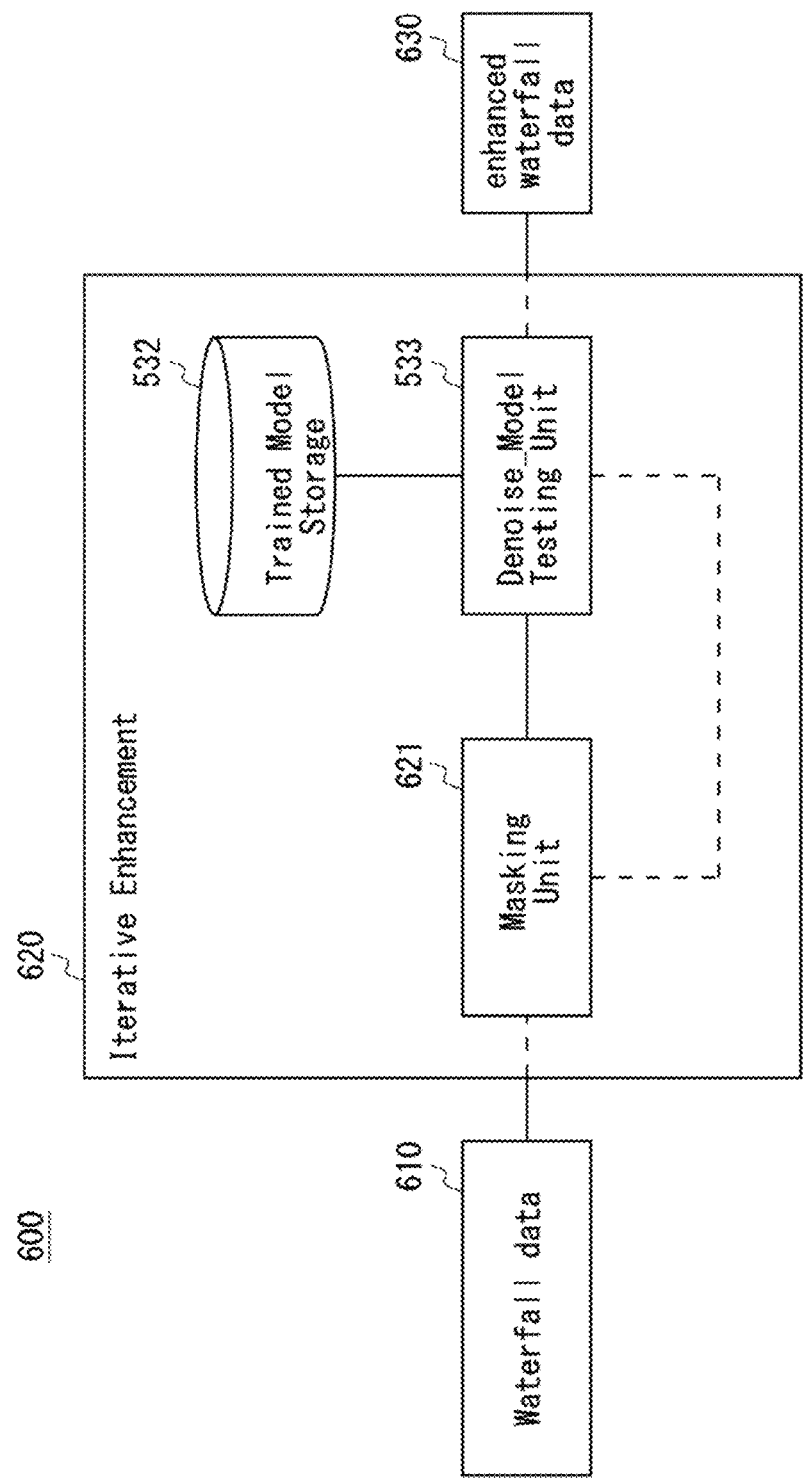
FIG. 10 is a view illustrating a functional configuration of a proposed system of iteratively analyzing waterfall data in accordance with some embodiments.

FIG. 10 is a functional block diagram illustrating a system for iteratively enhancing waterfall data in accordance with some embodiments. System 600 includes a waterfall data 610, an iterative enhancement unit 620 and an enhanced waterfall data 630. Iterative enhancement unit 620 further includes a Masking operation 621 and two units— Trained Model Storage 532, Testing unit 533—from System 500.

Waterfall data 610 may represent the output of the Data Acquisition unit 512 or the Pre-Processing unit 522. Waterfall data 610 is an input to the iterative enhancement unit 620.

Enhancement unit 620 is used to iteratively enhance the waterfall data 610 by using the enhancement obtained in a previous iteration from the Testing unit 533. In the first iteration, the waterfall data 610 is not masked by the masking unit 621. In a subsequent iteration, the masking unit 621 is used to modify the waterfall data 610 according to the enhancement obtained in a previous iteration. Then, the masked waterfall data is given as an input to the Testing unit 533. Over a plurality of iterations, when a convergence criterion and/or a satisfactory enhancement is obtained from the Testing unit 533, the iterative unit 620 is stopped and an enhanced waterfall data 630 is outputted.

A purpose of using the enhancement unit 620 is to extract weaker vibration patterns of traversing vehicles. Weak vibration patterns can be observed when a vehicle has less weight and therefore cannot exert sufficient pressure over a roadway as compared to heavier vehicles. Weak vibration patterns can also be observed when a vehicle is traversing in a lane that is a bit far from the optical fiber cable 121.

Masking unit 621 may include several variations of masking techniques depending on the application at hand. One masking technique can be to remove the waterfall data corresponding to the enhanced data obtained in each iteration and amplify the remaining waterfall data. In other words, the stronger vibration patterns extracted in each iteration are removed and then the weaker vibration patterns are amplified and extracted in the subsequent iterations.

Another masking technique can be to dampen the waterfall data corresponding to the enhanced data obtained in each iteration. In other words, the stronger vibration patterns extracted in each iteration are dampened and the weaker vibration patterns are relatively amplified and extracted in the subsequent iterations.

Another masking technique can be to replace the waterfall data corresponding to the enhanced data obtained in each iteration and amplify the remaining waterfall data. In other words, the stronger vibration patterns extracted in each iteration are replaced with their obtained enhanced patterns and then the weaker vibration patterns are amplified and extracted in the subsequent iterations.

A combination of the aforementioned masking techniques can be also used during the operation of masking unit 621.

As described above, the system according to the embodiment can estimate interpretable labels.

Figure 11:
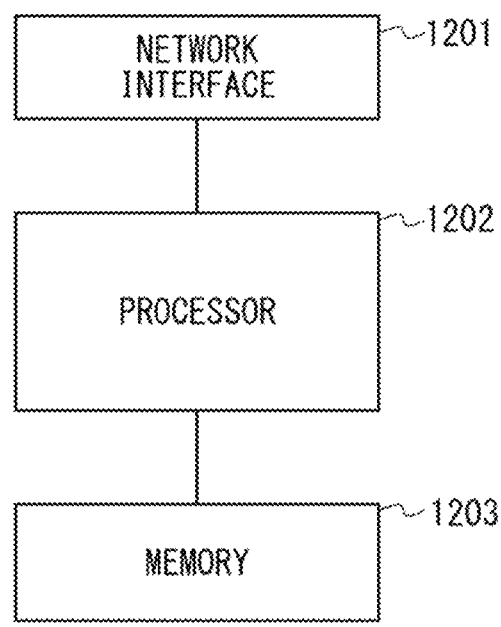
FIG. 11 is a block diagram illustrating the configuration example of the Learning apparatus and testing apparatus.

FIG. 11 is a block diagram illustrating the configuration example of the Learning apparatus 510 and testing apparatus 520. In view of FIG. 11, the Learning apparatus 510 and testing apparatus 520 include a network interface 1201, a processor 1202 and a memory 1203. The network interface 1201 is used to communicate with a network node. The network interface 1201 may include, for example, a network interface card (NIC) compliant with, for example, IEEE 802.3 series.

The processor 1202 performs processing of the Learning apparatus 510 and testing apparatus 520 described with reference to the sequence diagrams and the flowchart in the above embodiments by reading software (computer program) from the memory 1203 and executing the software. The processor 1202 may be, for example, a microprocessor, an MPU or a CPU. The processor 1202 may include a plurality of processors.

The processor 1202 performs data plane processing which includes digital baseband signal processing for wireless communication, and control plane processing. In a case of, for example, LTE and LTE-Advanced, the digital baseband signal processing of the processor 1004 may include signal processing of a PDCP layer, an RLC layer and an MAC layer. Furthermore, the signal processing of the processor 1202 may include signal processing of a GTP-U UDP/IP layer in an X2-U interface and an S1-U interface. Furthermore, the control plane processing of the processor 1004 may include processing of an X2AP protocol, an S1-MME protocol and an RRC protocol.

The processor 1202 may include a plurality of processors. For example, the processor 1004 may include a modem processor (e.g., DSP) which performs the digital baseband signal processing, a processor (e.g. DSP) which performs the signal processing of the GTP-U UDP/IP layer in the X2-U interface and the S1-U interface, and a protocol stack processor (e.g., a CPU or an MPU) which performs the control plane processing.

The memory 1203 is configured by a combination of a volatile memory and a non-volatile memory. The memory 1203 may include a storage disposed apart from the processor 1202. In this case, the processor 1202 may access the memory 1203 via an unillustrated I/O interface.

In the example in FIG. 11, the memory 1203 is used to store a software module group. The processor 1202 can perform processing of the Learning apparatus 510 and testing apparatus 520 described in the above embodiments by reading these software module groups from the memory 1203 and executing the software module groups.

Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Part of or all the foregoing embodiments can be described as in the following appendixes, but the present invention is not limited thereto.

(Supplementary Note 1)

A traffic monitoring apparatus comprising:
at least one memory storing instructions; and
at least one processor configured to execute the instructions to;
  acquire waterfall data from a distributed acoustic sensor (DAS), wherein the waterfall data includes a generation position of a vibration on a roadway adjacent to the DAS, a generation time of the vibration and an amplitude of the vibration;
  preprocess the waterfall data;
  estimate at least one enhancement of the processed waterfall data, wherein an enhancement corresponds to a traffic flow property; and
  estimate at least one traffic flow property of the roadway from the enhancements of the processed waterfall data.

(Supplementary Note 2)

The traffic monitoring apparatus of note 1, wherein the processor is further configured to execute the instructions to estimate an enhancement using a pre-trained model.

(Supplementary Note 3)

The traffic monitoring apparatus of note 1 or 2, wherein each enhancement is estimated within a predetermined time range and within a predetermined position range.

(Supplementary Note 4)

The traffic monitoring apparatus of any one of notes 1 to 3, wherein the traffic flow property corresponding to an enhancement is the trajectory of each vehicle on the roadway.

(Supplementary Note 5)

The traffic monitoring apparatus of any one of notes 1 to 4, wherein the traffic flow property corresponding to an enhancement is the size of each vehicle on a roadway and/or the occupancy of the roadway and/or the damage to a roadway.

(Supplementary Note 6)

The traffic monitoring apparatus of note 2, wherein the pre-trained model is generated by training a portion of the processed waterfall data and at least one enhancement of processed waterfall data used as labels, wherein an enhanced waterfall data is obtained from a secondary acquisition means.

(Supplementary Note 7)

The traffic monitoring apparatus of note 2, wherein the pre-trained model is generated by training synthetically emulated waterfall data and at least one synthetically emulated enhancement of emulated waterfall data used as labels.

(Supplementary Note 8)
The traffic monitoring apparatus of note 6, wherein the secondary acquisition means comprises a video and/or an inductive loop based traffic monitoring system.

(Supplementary Note 9)
The traffic monitoring apparatus of note 6, wherein the secondary acquisition means comprises an electronic toll collection system.

(Supplementary Note 10)
The traffic monitoring apparatus of any one of notes 1 to 5, wherein the processor is further configured to iteratively estimate an enhancement of waterfall data; wherein a portion of waterfall data is masked in an iteration using an enhancement estimated in a preceding iteration until a satisfactory enhancement is achieved.

(Supplementary Note 11)
The traffic monitoring apparatus of note 10, wherein the masking operation removes a portion of waterfall data corresponding to a portion of an estimated enhancement and amplifies the remaining waterfall data.

(Supplementary Note 12)
The traffic monitoring apparatus of note 10, wherein the masking operation dampens the waterfall data corresponding to an estimated enhancement.

(Supplementary Note 13)
The traffic monitoring apparatus of note 10, wherein the masking operation replaces a portion of the waterfall data with a corresponding portion of an estimated enhancement and amplifies the remaining waterfall data.

(Supplementary Note 14)
A system comprising:
a distributed acoustic sensor (DAS);
an optical fiber connected to the DAS and provided along a roadway; and
the traffic monitoring apparatus of any one of notes 1 to 13.

(Supplementary Note 15)
A traffic monitoring method comprising:
acquiring the waterfall data from a distributed acoustic sensor (DAS), wherein the waterfall data includes a generation position of a vibration on a roadway adjacent to the DAS, a generation time of the vibration and an amplitude of the vibration;
preprocessing the waterfall data;
estimating at least one enhancement of the processed waterfall data, wherein an enhancement corresponds to a traffic flow property; and
estimating at least one traffic flow property of the roadway from the enhancements of the processed waterfall data.

(Supplementary Note 16)
A non-transitory computer readable medium storing a program for causing a computer to execute a traffic monitoring method, the method comprising:
acquiring the waterfall data from a distributed acoustic sensor (DAS), wherein the waterfall data includes a generation position of a vibration on a roadway adjacent to the DAS, a generation time of the vibration and an amplitude of the vibration;
preprocessing the waterfall data;
estimating at least one enhancement of the processed waterfall data, wherein an enhancement corresponds to a traffic flow property; and
estimating at least one traffic flow property of the roadway from the enhancements of the processed waterfall data.
This application relates to International Application No. PCT/JP2019/026131, the disclosure of which is herein incorporated in its entirety.

INDUSTRIAL APPLICABILITY

The present disclosure is applicable to a system for analyzing waterfall data obtained from DAS.

REFERENCE SIGNS LIST

100 DAS system
111 Traffic monitoring apparatus
112 DAS
121 Optical fiber
130 Roadway
140 Vehicle
150 Vehicle
210 Waterfall data
220 221, 222, 223, 224 Waterfall data
310 Learning apparatus
320 Testing apparatus
401 Noisy waterfall data
410, 420 enhancements
411, 421 Enhanced waterfall data
421, 422 Enhanced waterfall data
500 System
510 Learning apparatus
511 Waterfall data acquisition unit
512 Waterfall data acquisition unit
520 Testing Apparatus
521 Preprocessing unit
531 Denoising model training unit
532 Trained Model Storage
533 Testing unit
542 enhanced waterfall data
550 Traffic flow property estimation unit
560 Estimated label
1201 NETWORK INTERFACE
1202 PROCESSOR
1203 MEMORY

The invention claimed is:
1. A traffic monitoring apparatus comprising:
at least one memory storing instructions; and
at least one processor configured to execute the instructions to:
acquire waterfall data from a distributed acoustic sensor (DAS), wherein the waterfall data includes a generation position of a vibration on a roadway adjacent to the DAS, a generation time of the vibration and an amplitude of the vibration;
preprocess the waterfall data;
iteratively estimate at least one enhancement of the preprocessed waterfall data; and
estimate at least one traffic flow property of the roadway from the enhancements of the preprocessed waterfall data;
wherein iteratively estimate at least one enhancement of the preprocessed waterfall data includes performing a masking operation on a portion of the preprocessed waterfall data in an iteration using an enhancement estimated in a preceding iteration until a satisfactory enhancement is achieved,
wherein the masking operation includes
removing a portion of the preprocessed waterfall data corresponding to a portion of an estimated enhancement and amplifying the remaining preprocessed waterfall data,
dampening the preprocessed waterfall data corresponding to an estimated enhancement, or replacing a portion of the preprocessed waterfall data with a corresponding portion of an estimated enhancement and amplifying the remaining preprocessed waterfall data.

2. The traffic monitoring apparatus of claim 1, wherein the processor is further configured to execute the instructions to estimate an enhancement using a pre-trained model.

3. The traffic monitoring apparatus of claim 1, wherein each enhancement is estimated within a predetermined time range and within a predetermined position range.

4. The traffic monitoring apparatus of claim 1, wherein the traffic flow property corresponding to an enhancement is the trajectory of each vehicle on the roadway.

5. The traffic monitoring apparatus of claim 1, wherein the at least one traffic flow property is the size of each vehicle on the roadway and/or the occupancy of the roadway and/or the damage to the roadway.

6. The traffic monitoring apparatus of claim 2, wherein the pre-trained model is generated by training a portion of the preprocessed waterfall data and at least one enhancement of the preprocessed waterfall data used as labels, wherein an enhanced waterfall data is obtained from a secondary acquisition means.

7. The traffic monitoring apparatus of claim 2, wherein the pre-trained model is generated by training synthetically emulated waterfall data and at least one synthetically emulated enhancement of emulated waterfall data used as labels.

8. The traffic monitoring apparatus of claim 6, wherein the secondary acquisition means comprises a video and/or an inductive loop based traffic monitoring system.

9. The traffic monitoring apparatus of claim 6, wherein the secondary acquisition means comprises an electronic toll collection system.

10. A system comprising:
a distributed acoustic sensor (DAS);
an optical fiber connected to the DAS and provided along the roadway; and
the traffic monitoring apparatus of claim 1.

11. A traffic monitoring method comprising:
acquiring the waterfall data from a distributed acoustic sensor (DAS), wherein the waterfall data includes a generation position of a vibration on a roadway adjacent to the DAS, a generation time of the vibration and an amplitude of the vibration;
preprocessing the waterfall data;
iteratively estimating at least one enhancement of the preprocessed waterfall data; and
estimating at least one traffic flow property of the roadway from the enhancements of the preprocessed waterfall data;
wherein iteratively estimating at least one enhancement of the preprocessed waterfall data includes performing a masking operation on a portion of the preprocessed waterfall data in an iteration using an enhancement estimated in a preceding iteration until a satisfactory enhancement is achieved,
wherein the masking operation includes
removing a portion of the preprocessed waterfall data corresponding to a portion of an estimated enhancement and amplifying the remaining preprocessed waterfall data,
dampening the preprocessed waterfall data corresponding to an estimated enhancement, or
replacing a portion of the preprocessed waterfall data with a corresponding portion of an estimated enhancement and amplifying the remaining preprocessed waterfall data.

12. A non-transitory computer readable medium storing a program for causing a computer to execute a traffic monitoring method, the method comprising:
acquiring the waterfall data from a distributed acoustic sensor (DAS), wherein the waterfall data includes a generation position of a vibration on a roadway adjacent to the DAS, a generation time of the vibration and an amplitude of the vibration;
preprocessing the waterfall data;
iteratively estimating at least one enhancement of the preprocessed waterfall data; and
estimating at least one traffic flow property of the roadway from the enhancements of the preprocessed waterfall data;
wherein iteratively estimating at least one enhancement of the preprocessed waterfall data includes performing a masking operation on a portion of the preprocessed waterfall data in an iteration using an enhancement estimated in a preceding iteration until a satisfactory enhancement is achieved,
wherein the masking operation includes
removing a portion of the preprocessed waterfall data corresponding to a portion of an estimated enhancement and amplifying the remaining preprocessed waterfall data,
dampening the preprocessed waterfall data corresponding to an estimated enhancement, or
replacing a portion of the preprocessed waterfall data with a corresponding portion of an estimated enhancement and amplifying the remaining preprocessed waterfall data.

* * * * *